United States Patent Office 3,743,580
Patented July 3, 1973

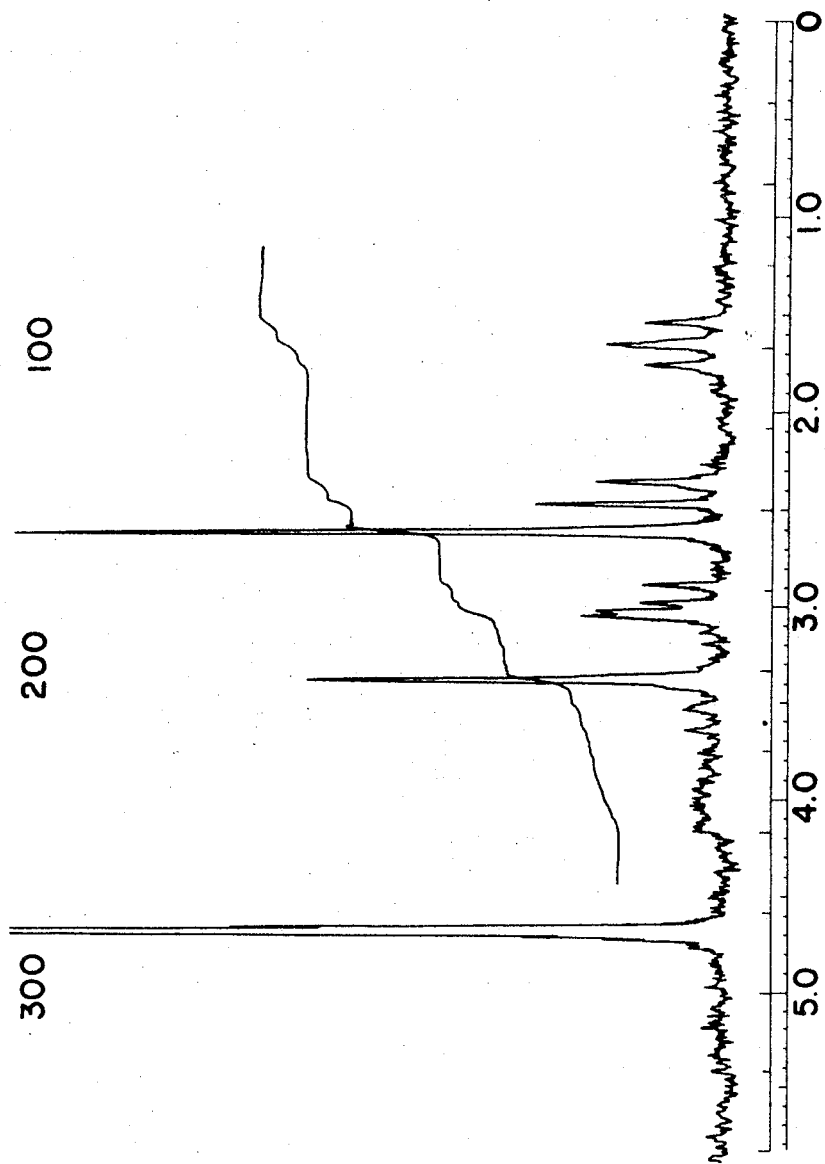

3,743,580
ANTIBIOTIC, NEGAMYCIN, AND PROCESSES FOR THE PREPARATION THEREOF
Hamao Umezawa, Tokyo, Shinichi Kondo, Yokohama, and Kenji Maeda, Tomio Takeuchi, and Masa Hamada, Tokyo, Japan, assignors to Zaidan Hojin Biseibutsu Kagaku Kenkyu Kai, Kami-Osaki, Shinagawa-ku, Tokyo, Japan
Original application Apr. 28, 1970, Ser. No. 32,641, now Patent No. 3,679,742. Divided and this application May 15, 1972, Ser. No. 253,618
Int. Cl. C12b 1/00
U.S. Cl. 195—80 R  7 Claims

ABSTRACT OF THE DISCLOSURE

Process for the production of an antibiotic substance called negamycin which comprises cultivating a strain of Streptomyces purpeofuscus A.T.C.C. 21470 in an aqueous carbohydrate solution containing a nitrogenous nutrient under aerobic conditions until substantial antibacterial activity is imparted to said solution and then recovering said negamycin from said solution and negamycin which is effective for inhibiting Psuedomonas, Salmonella, Shigella, Klebsiella, E. coli, Staphylococci and which has the following structure:

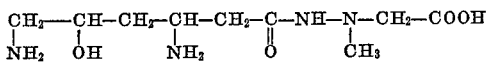

---

Figure 1:
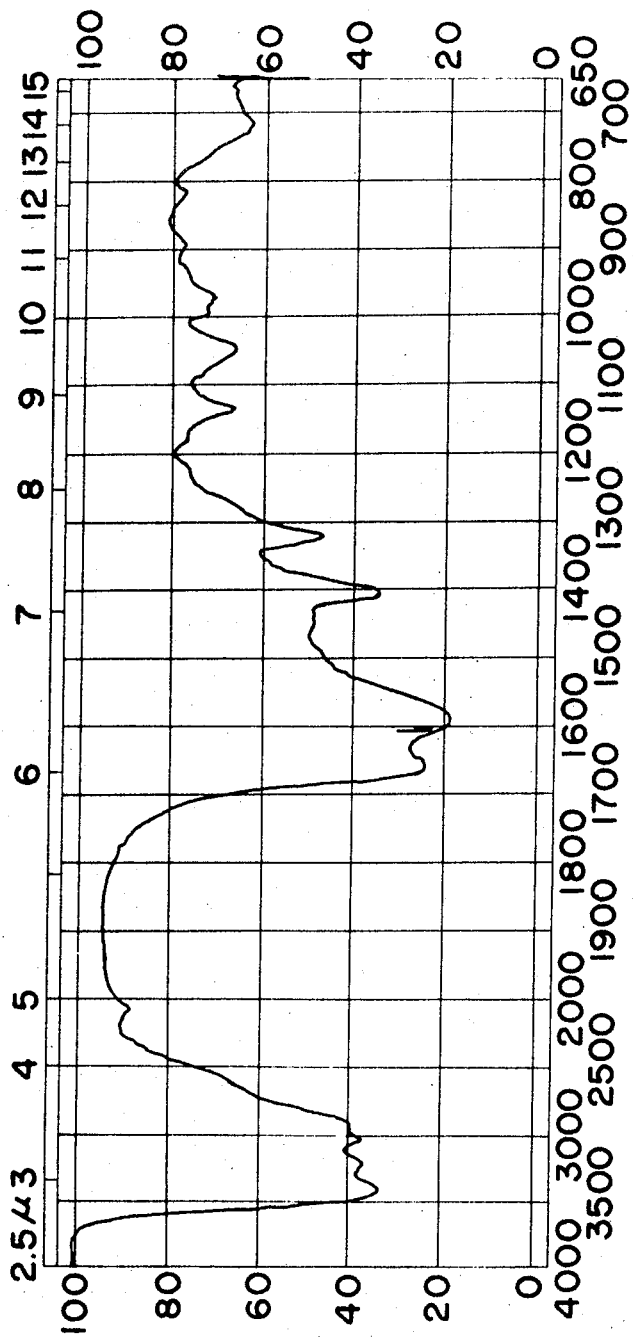

This is a division of application Ser. No. 32,641, filed Apr. 28, 1970, now Pat. No. 3,679,742.

This invention relates to a new useful antibiotic substance called negamycin, and to its production. More particularly, it relates to processes for its production by fermentation and methods for recovery and purification. This invention embraces this antibacterial agent and its salts in dilute solutions, as crude concentrates, as crude solids and as pure solid. This substance is effective in inhibition of Pseudomonas, Salmonella, Klebsiella and Staphylococci. This substance has low toxicity and exhibits therapeutic effect on infections of Pseudomonas and other sensitive organisms in mice. This substance is useful in the cure of infections of Pseudomonas and other sensitive organisms in humans and animals.

There is now provided, according to the present invention, an antibiotic substance (and its salts) effective in inhibiting Pseudomonas, Salmonella, Klebsiella and Staphylococci, said antibiotic being soluble in water and practically insoluble in methanol, ethanol, butanol, ethyl acetate, butyl acetate, chloroform, and benzene, exhibiting no maximum absorption of ultraviolet light from 220–400 m$\mu$, giving positive reactions to Ninhydrin, red tetrazolium and Rydon-Smith and negative reactions to Sakaguchi and Molisch, exhibiting absorption bands in the infrared region of the spectrum when pelleted with potassium bromide at the following wave numbers in cm.$^{-1}$: 3430, 3200, 3050, 2950, 1660, 1590, 1405, 1320, 1140, 1050, 970, 890, 820, 720, being optically active, $[\alpha]_D^{29} = +2.5°$ (c. 2, H$_2$O), having the molecular formula of C$_9$H$_{20}$N$_4$O$_4$, showing three pK values of 3.55, 8.10, 9.75, and having the following structure:

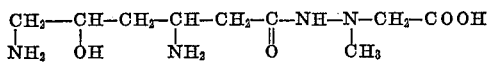

Referring to the drawings: FIG. 1 is the infrared absorption spectrum of negamycin taken with potassium bromide, and FIG. 2 is the nuclear magnetic resonance spectrum of negamycin in D$_2$O.

There is provided according to the present invention the process for the production of the antibiotic negamycin which comprises cultivating a strain of S. purpeofuscus in a nutrient medium under aerobic conditions until a substantial amount of negamycin is accumulated in said solution.

Negamycin is a new antibiotic discovered by the present inventors. The organism producing the antibiotic of the present invention was first found by the present inventors and was isolated from a soil sample collected at Myogisan, Gunma prefecture in August, 1964 and was given the laboratory number M890–C2. The inventors also isolated negamycin from other two strains which were given the laboratory numbers of No. MA91–M1 and No. MA104–M1. The strain No. MA91–M1 was isolated from a soil sample collected at Nojiriko, Nagano prefecture in January 1965, and the strain No. MA104–M1 was isolated from a soil sample collected at Sakomachi, Tokushima city in February 1965. These strains have many common properties with the strain No. M890–C2 and also with Streptomyces purpeofuscus. Though there were some minor differences among them, these strains were classified as Streptomyces purpeofuscus. Moreover, a type culture of S. purpeofuscus (S. purpeofuscus Yamaguchi and Saburi ISP 5283, ISP being the abbreviation of International Streptomyces Project) was confirmed by the present inventors to produce negamycin. The strain No. M890–C2 was deposited Kogyogijutsuin Hakko Kenkyujo on May 6, 1969, and the deposit number 306 was given. It was also deposited in American Type Culture Collection as ATCC 21470.

The strain No. M890–C2 has the following characteristics. Under microscopic, well-branched substrate mycelium develops straight to flexuous aerial mycelium without whorl branching nor spiral formation. Surface of spore is smooth.

Characters on various media (Designation of color is described in [ ] in accordance with "Color Harmony Manual" of Container Corporation of America):

(1) On glycerol Czapek's agar medium incubated at 27° C.: Pale yellow to dark yellowish brown [Spice brown 4 ni] growth forms abundant aerial mycelium of light grey color; brownish to pale reddish brown soluble pigment is produced;

(2) On Krainsky's glucose asparagine agar medium incubated at 27° C.: Growth of yellowish brown [Luggage Tan 4 ne] to dark yellowish brown [Clove Brown 3 ni] produces aerial mycelium of yellowish white to light brownish gray; soluble pigment is faint brown;

(3) On calcium malate agar medium incubated at 27° C.: Growth of grayish brown [Fawn 5 ig] produces scant grayish white to light gray aerial mycelium. No soluble pigment. Calcium malate around growth is solubilized strongly after 3 days incubation;

(4) In peptone solution containing 1.0% sodium nitrate incubated at 27° C.: Colorless to pale yellowish brown growth without aerial mycelium. No soluble pigment or brown pigment slightly. Weak reduction of nitrate is observed;

(5) On potato plug incubated at 27° C.: Wrinkled growth of pale yellowish brown [Lt Gold 2 ic] to yellowish brown [Yellow Maple 3 ng], lately dark yellowish brown [Clove Brown 3 pl] to black. No aerial mycelium. Faint brownish soluble pigment;

(6) On starch agar plate incubated at 27° C.: Pale yellowish brown to yellowish brown [Spice Brown 4 ni] growth produces aerial mycelium of yellowish white to light gray color. Brownish to pale reddish brown soluble pigment. Positive hydrolysis of starch;

(7) On nutrient agar medium incubated at 37° C.: No growth within 14 days incubation;

(8) On nutrient agar medium incubated at 27° C.: Pale reddish brown [Brick Red 6½ ng] growth produces no aerial mycelium and produces pale reddish brown soluble pigment;

(9) On Loeffler's coagulated serum medium incubated at 37° C.: No growth within 14 days incubation;

(10) On gelatin stub cultured at 20° C.: Colorless to pale yellowish brown growth produces no aerial mycelium and produces soluble pigment of brown to dark brown color. Liquefaction of gelatin is strong;

(11) On skimmed milk incubated at 37° C.: Colorless growth produces no aerial mycelium nor soluble pigment. After complete coagulation of milk at 4 days incubation, slow peptonization occurs;

(12) On tyrosine agar medium incubation at 27° C.: Growth of colorless or gray to dark brown color produces thin aerial mycelium of white to grayish white color. Determination of tyrosinase activity is difficult because of blackish pigmentation of soluble pigment;

(13) On cellulose (filter paper) incubated at 27° C.: Scant growth without decomposition of cellulose;

(14) Utilization of carbohydrates on Pridham-Gottlieb's basal medium incubated at 27° C.: Positive growth with starch, dextrin, glycerol, galactose, glucose, sucrose, maltose and mannose. Negative growth with inositol, lactose, mannitol, raffinose, rhamnose, inulin, sorbitol, fructose, xylose, arabinose, salicin and dulcitol.

The characters of the strain No. M890–C2 may be summarized as follows: It belongs to genus Streptomyces having aerial mycelium forming neither spirals nor whorls; the surface of spores is smooth; on various media it forms dark yellowish brown growth with gray or light gray to light brownish gray aerial mycelium; it forms no soluble pigment or faintly reddish brown soluble pigment very slightly; the reverse of the growth turns to black during days of the incubation; on nutrient agar at 27° C. it forms reddish brown growth and reddish brown soluble pigment; it forms melanin pigment, hydrolyzes starch and has relatively strong proteolytic activity. These properties conform to those of *Streptomyces purpeofuscus* Yamaguchi and Saburi described in International Journal of Systematic Microbiology, 18, 364, 1968. However, the strain No. M890–C2 does not utilize lactose and xylose which are utilized by *S. purpeofuscus*. On the other hand, another strain No. MA104–M1 utilizes xylose. Though the strains producing negamycin isolated by the present inventors had minor differences with known species of *S. purpeofuscus*, they were assigned to *S. purpeofuscus*. Moreover, the type culture of *S. purpeofuscus* (ISP 5283) was confirmed by the inventors to produce negamycin. On production of antibiotics by *S. purpeofuscus* Yamaguchi and Saburi there has been only simple description (J. of General and Applied Microbiology, 1, 201–234, 1955) that its culture filtrate showed inhibition against trichomonas, Gram positive bacteria and acid-fast bacteria. There was no description of production of antibiotics active against Gram negative bacteria. Therefore, though *S. purpeofuscus* is a known species, there has never been observation on production of negamycin until the present invention.

As it is well known, Streptomyces is generally not stable and easily gives mutants and variants artificially or in nature. *Streptomyces purpeofuscus* in the present invention includes all of these mutants and variants which produce negamycin, that is, those which can not be absolutely differentiated from *S. purpeofuscus* and produce negamycin.

Method of determining amount of negamycin: It is determined by an ordinary cylinder plate method using pure negamycin as the standard and the sensitive organism such as *E. coli* K12, *Pseudomonas aeruginaosa*, etc.

*S. purpeofuscus* producing negamycin when grown under suitable conditions produces negamycin. A fermentation broth containing negamycin is prepared by inoculating spores or mycelium of the negamycin-producing organism into a suitable medium and then cultivating under aerobic condition. For the production of negamycin cultivation on a solid medium is possible, but for production of large quantities cultivation in a liquid medium is preferred. Any fermentation temperature can be employed within the range in which the negamycin-producing organism can grow and produce negamycin, although 25–32° C. is preferred. Media consisting of known kinds of nutritional sources for actinomycetes are useful for production of negamycin. For example, commercial products such as pepstone, meat extract, N–Z amine, casein, soybean meal, corn steep liquor, peanuts meal, cotton seed meal, sodium nitrate, ammonium nitrate, ammonium sulfate and other nitrogenous materials such as wheat bran, rice bran, etc. are useful as the nitrogen source. The commerically available products, such as glucose, glycerol, starch, maltose, dextrin, sucrose, lactose, soybean oils and other carbohydrates or other fats in pure or crude state are useful as the carbon source. Sodium chloride, sodium or potassium phosphate, calcium carbonate can be also added. Trace of metal salts can be added, if necessary. Any kinds of constituents which can be utilized by negamycin-producing organisms for production of negamycin is useful.

The fermentation is continued until negamycin is substantially accumulated. For example, spores and mycelia on the slant culture of *S. purpeofuscus* were inoculated into a medium consisting of glucose 2.0%, starch 2.0%, soybean meal 2.0%, yeast extract 0.5%, sodium chloride 0.25%, calcium carbonate 0.35%, $CuSO_4 \cdot 5H_2O$ 0.0005%, $MnCl_2 \cdot 7HO$ 0.0005%, $ZnSO_4 \cdot 7H_2O$ 0.005%, (adjusted to pH 7.0) and shake-cultured at 27° C. Then, the accumulation of negamycin was observed in 3–8 days, for instance, 20 $\mu$g./ml. on 3rd day, 108 $\mu$g./ml. (pH 7.4) on 6th day, 185 $\mu$g./ml. (pH 7.6) on 7th day, 122 $\mu$g./ml. (pH 7.8) on 8th day.

Negamycin is relatively stable in its aqueous solution. For instance, after heating of 5 mg./ml. negamycin solution of various pH (that is 1.8, 7.2, 9.2) at 60° C. for 30 minutes, 91% remained without decomposition. When 2 mg./ml. of negamycin solution of various pH was kept at 27° C. for a week, the following percent of negamycin remained without decomposition: 86% at pH 2.25, 80% at pH 4.90, 76% at pH 7.15, 89% at pH 9.0, 79% at pH 10.2.

There is provided according to the present invention processes for extraction and purification of negamycin. Negamycin is soluble in water and exists mainly in the liquid part of the fermentation broth. Negamycin in the broth is not transferred from the broth to organic solvents such as butanol, ethyl acetate, ether, chloroform, benzene.

With the adsorbents, negamycin can be obtained from the fermented broth or from its aqueous solution. Active carbon is one of preferred adsorbents. Negamycin adsorbed on active carbon can be eluted efficiently by aqueous methanol, aqueous butanol, aqueous acetone. It is more easily eluted, if the elution is made at acid condition with hydrochloric acid. Though negamycin has carboxylic acid group, having two basic groups the whole molecule is basic and adsorbed by a cation exchange resin. A cation exchange resin process is the most suitable method for extraction of negamycin from the fermented broth or its aqueous solution. All kinds of resins having carboxylic acid group or sulfonic acid group are useful and they can be used in H form, sodium form potassium form or ammonium form or the mixed form. Negamycin adsorbed on the cation exchange resin can be eluted with an acid such as hydrochloric acid, sulfuric acid, etc., but more preferably with aqueous ammonia. Negamycin which has carboxylic acid group can be adsorbed also by an anion exchange resin. For instance, Dowex 1X2 (trade name, Dow Chemical Co., U.S.A.) in OH form adsorbs negamycin and negamycin adsorbed is eluted with dilute hydrochloric acid. However, anion exchange resin having weak basic group such as Amberlite IR45 (trade name, Rohm and Haas Co., U.S.A.) in OH form can be used for neutralization of acidic solution of negamycin without substantial adsorption of this antibiotic.

Mycelium in the fermented broth can be removed by filtration or centrifugation. The fermented broth including mycelium can be also directly applied to a resin column without procedure of removal of the mycelium, if a large particle which prevents the pass through the column was removed by passing through metal nets. The following is one of method suitable for isolation of negamycin from the fermented broth of *S. purpeofuscus*: the fermented broth is filtered or centrifuged and the filtrate or the supernatant is passed through a cation exchange resin column in 70% $NH_4$ form, and after the column was washed with water negamycin adsorbed was eluted with 2.0% $NH_4OH$ in water and the eluate containing negamycin is concentrated under reduced pressure to remove ammonia; the concentrated solution is passed through a column of Dowex 1X2 in OH form and after washed with water negamycin on the resin is eluted with 0.5 N HCl; the eluate containing negamycin is neutralized with IR45 resin in OH form and concentrated under reduced pressure to dryness, yielding a crude powder of negamycin hydrochloride; the crude powder of the hydrochloride is dissolved in water and passed through a resin such as Amberlite CG-50 (trade name, Rohm and Haas Co., U.S.A.) in $NH_4$ form and the chromatography is developed with water or 0.1% $NH_4OH$; the fractions containing negamycin is evaporated under vacuum, yielding white powder of pure negamycin; if the purity is not enough, the chromatography is repeated. On the basis of the basic property negamycin can be precipitated by addition of a water-insoluble acid, for instance, picric acid, p-hydroxyazobenzene-p'-sulfonic acid etc. Negamycin crystallizes as the salt of p-hydroxyazobenzene-p'-sulfonic acid. Negamycin in these water-insoluble salts can be separated from the acids by methods known to separate a base from a water-insoluble acid, for instance, negamycin p-hydroxyazobenzene-p'-sulfonate is treated with HCl in ethanol and negamycin hydrochloride is precipitated. Water-insoluble acid such as Targitol 4, Targitol 7 (Union Carbide and Carbon Chemical Co.) and sodium laurylsulfonate can also be used for precipitation of negamycin.

Negamycin purified by methods described above is obtained as white powder. It is freely soluble in water, and insoluble in methanol, ethanol, esters, benzene. Negamycin in the aqueous solution shows end absorption, but no maximum absorption of ultraviolet light from 220 to 400 m$\mu$. It is amphoteric, showing strong basic property and weak acidic property. Under 3500 v. and pH 1.8 buffer (formic acid-acetic acid-water in 25:75:900 in volume) negamycin moves by 12 cm. to cathode, and taking the mobility of alanine as 1.0, the mobility of negamycin is 1.4. It forms acid addition salts with hydrochloric acid, sulfuric acid, p-hydroxyazobenzene-p'-sulfonic acid, picric acid, etc. Negamycin having carboxylic acid group also forms metal salts and esters. It gives positive reactions to Ninhydrin, Rydon-Smith and negative reactions to anthrone and Sakaguchi. When heated at 105° C. in 6 N HCl for 6 hours, the hydrolysate showed more than 3 Ninhydrin products (the main products are three). Three man hydrolysis products are $\tau$-hydroxy-$\beta$-lysine, N,N'-dimethylhydrazine and methylamine. Sarcosine and 1-methylhydraginoacetic acid are obtained as minor hydrolysis products.

Most purified negamycin melted gradually from 75° C. and decomposed with foaming at 110–120° C. The following result was obtained by elemental analysis: calcd. for $C_9H_{20}N_4O_4 \cdot 2H_2O$: C, 38.02; H, 8.51; N, 19.71; O, 33.77. Found: C, 37.78; H, 8.62; N, 18.94; O, 31.70. As the titration equivalent 287 was obtained. Negamycin p-hydroxyazobenzene-p'-sulfonate is obtained as yellow-orange crystals, M.P. 180–182° C. with decomposition, which shows about $\frac{1}{3}$ antibacterial activity of negamycin and which showed the following analytical result: calcd. for $C_9H_{20}N_4O_4 (C_{12}H_{10}N_2O_4S)_2 2H_2O$: C, 47.13; H, 5.27; N, 13.33; O, 26.64; S, 7.63. Found: C, 47.09; H, 5.16; N, 13.20; O, 25.53; S, 8.01. Negamycin has three titrable pK as follows: 3.55, 8.10, 8.75. In the infrared spectrum of negamycin taken with potassium bromide, absorption bands were observed at the following wave numbers in cm.$^{-1}$: 3430, 3200, 3050, 2950, 1660, 1590, 1405, 1320, 1140, 1050, 970, 890, 820, 720. Negamycin p-hydroxyazobenzene-p'-sulfonate shows absorptions bands at the following wave numbers in cm.$^{-1}$: 3550, 3400, 3350, 3250, 3200, 3050, 2950, 1730, 1690, 1600, 1560, 1510, 1440, 1430, 1400, 1360, 1280–1100, 1060, 1030, 1010, 990, 960, 945, 900, 880, 850, 800, 715, 680. In this salt the band for carboxylic acid is shown at 1730 cm.$^{-1}$. The infrared spectrum of negamycin methyl ester shows the bands at the following wave numbers in cm.$^{-1}$: 3400, 3200, 3000, 2950, 1740, 1665, 1600, 1485, 1445, 1400, 1220, 1140, 1050, 1000, 960, 890, 720. The band for the ester group is at 1740 and 1220 cm.$^{-1}$.

The structure already shown was proposed by the present inventors for negamycin on the basis of mass spectometry of negamycin methyl ester and triacetyl negamycin methyl ester and determination of structures of hydrolysis products.

Negamycin inhibits growth of Gram negative and positive organisms. When the antibacterial effect was tested by agar streak method using meat extract-peptone agar, the following organisms were inhibited at the following concentrations (one loopful amount of 20 hours nutrient broth culture was streaked; the values in parenthesis are the concentrations of partial inhibition): *Staphylococcus aureus* 209p 50 $\mu$g./ml.; *Staphylococcus aureus* 193 12.5 $\mu$g./ml.); *Staphylococcus aureus* Smith 50 $\mu$g./ml.; *Sarcina lutea* PCI–1001 12.5 $\mu$g./ml. (1.56 $\mu$g./ml.); *Bacillus subtilis* NRRL–B558 25 $\mu$g./ml. (12.5 $\mu$g./ml.); *E. coli* K12 3.12 $\mu$g./ml. 1.56 $\mu$g./ml.); *E. coli* NIHJ 12.5 $\mu$g./ml. (3.12 $\mu$g./ml.); *Shigella flexneri* 12.5 $\mu$g./ml.; *Salmonella typhosa* 3.12 $\mu$g./ml., *Klebsiella pneumoniae* PCI 602 12.5 $\mu$g./ml. (6.25 $\mu$g./ml.), *Seratia marscescens* 12.5 $\mu$g./ml. (6.25 $\mu$g./ml.), *Proteus vulgaris* OX19 6.25 $\mu$g./ml.; *Proteus rettgeri* (GN311) 12.5 $\mu$g./ml. (6.25 $\mu$g./ml.), *Pseudomonas aeruginosa* (No. 2) 12.5 $\mu$g./ml.; *Pseudomonas aeruginosa* No. 3. 25 $\mu$g./ml. (12.5 $\mu$g./ml.); *Pseudomonas fluorescens* 6.25 $\mu$g./ml. (3.12 $\mu$g./ml.); *Mycobacterium smegmatis* 607 100 $\mu$g./ml. When the 20 hours nutrient broth culture was 1000 times diluted and one loopful amount was streaked, then the growth inhibition was observed at half concentrations of those described above. In 0.5% peptone agar, the inhibitory effect was stronger than on the nutrient agar and the following organism were inhibited at the following concentrations (values in parenthesis are concentrations of partial inhibition): *S. aureus* 209p 1.56 $\mu$g./ml.; *S. lutea* PCI 1001 5.0 $\mu$g./ml. (2.5 $\mu$g./ml.; *B. Subtilis* NRRL–B558 12.5 $\mu$g./ml.; *E. coli* K12 1.56 $\mu$g./ml.; *E. coli* NIHJ 1.56 $\mu$g./ml.; *S. flexneri* 3.12 $\mu$g./ml.; *K. pneumoniae* PCI 602 6.25 $\mu$g./ml. (3.12 $\mu$g./ml.); *S. typhosa* <0.78 $\mu$g./ml.; *Pr. rettgeri* CN311 1.56 $\mu$g./ml., *S. marscescens* 12.5 $\mu$g./ml. (3.12 $\mu$g./ml.; *Ps. aeruginosa* No. 3 6.25 $\mu$g./ml. *Ps. aeruginosa* No. 46 3.12 $\mu$g./ml. (1.56 $\mu$g./ml.); *M. segmatis* 607 50 $\mu$g./ml. It does not inhibitc. albicans at 100 $\mu$g./ml. The inhibitory effect of negamycin is not reduced by serum, for instance, *E. coli* was inhibited by 3.12 $\mu$g./ml. of negamycin in all media containing serum at 0, 5, 10, 20, 40%. Negamycin exhibits stronger antibacterial effect at alkaline side, for instance, the inhibitory concentrations against *E. coli* in 0.5% peptone water of various pH were as follows; pH 5.0 12.5 $\mu$g./ml. (3.12 $\mu$g./ml.); pH 6.0 12.5 $\mu$g./ml. (3.12 $\mu$g./ml.); pH 7.0 3.12 $\mu$g./ml. (1.56 $\mu$g./ml.); pH 8.0 1.56 $\mu$g./ml. (0.78 $\mu$g./ml.); pH 9.0 1.56 $\mu$g./ml. (0.78 $\mu$g./ml.). In a cylinder plate method using 0.5% peptone agar and *E. coli* K12, 25 $\mu$g./ml. of negamycin showed the following inhibition diameters at the following pH: pH 6.0 16 mm.; pH 7.0 20 mm.; pH 8.0 21 mm.

Negamycin has low toxicity. The intravenous injection of 400 mg./kg. caused death of mice. No toxic sign was observed, when 200 mg./kg. was daily intraperitoneally injected to mice for 30 days. It has no delayed toxicity.

The intramuscular injection of 50 mg./kg. to rabbit gave high blood concentration such as 100 μg./ml. at 1 hour after the administration and 80% was excreted into urine in 24 hours indicating high concentration in urine, for instance 4480 μg./ml. in urine taken 1–2 hours after the injection. These results suggest the positive effect also in vivo. Really, negamycin was confirmed to be effective against infection of *Pseudomonas aeruginosa* No. 12, *Klebsiella pneumoniae* S–1802, *Salmonella typhosa* 63 and *Staphylococcus aureus* Smith S–424 in mice. $CD_{50}$ against these infections were 4.4, 5.0, 2.5 and 12.5 mg./kg., respectively, when 10 MLD was infected intraperitoneally and negamycin was subcutaneously injected immediately and 6 hours after the infection.

As described above, negamycin is an antibacterial substance having low toxicity and inhibiting Gram positive and negative bacteria including Pseudomonas. This antibiotic is easily differentiated from known antibiotics by its analytical results, its infrared spectrum, its amphoteric property, its behaviour on high voltage electrophoresis and its structure. Thus, negamycin is definitely a new antibiotic discovered by the present inventors.

As shown by the structure, hydrolysis of negamycin gives 1-methylhydrazino-acetic acid which was found to convert to N,N'-dimethylhydrazine. 1-methyl-hydrazino-acetic acid was found by the present inventors to inhibit glutamic acid-pyruvate transaminase and has liver toxicity. Negamycin has no such toxicity, however, considering the possible hydrolysis, negamycin should be infected for short period to treat the sensitive infections. Negamycin is also used locally for treatment of superficial infections such as infections in skin and mucous membrane. Moreover, negamycin is useful for synthesis of negamycin analogues.

Properties of negamycin is now clear and therefore on the basis of the properties disclosed by the present invention processes for production of this antibiotic is easily devised. The examples are shown below. However, this invention is not limited to these examples. This invention includes all modifications of processes described in this invention.

EXAMPLE 1

A medium 125 ml. containing glucose 2%, starch 2%, soybean meal 2%, yeast extract 0.5%, NaCl 0.25%, $CaCO_3$ 0.35%, $CuSO_4 \cdot 5H_2O$ 0.0005%, $MnCl_2 \cdot 7H_2O$ 0.0005%, and $ZnSO_4 \cdot 7H_2O$ 0.0005% was placed in a shaking flask of 500 ml. After adjusting pH to 7.0, it was sterilized at 120° C. for 20 minutes. To this medium, 2.5 ml. of 2 days shaken-cultured broth of the strain No. M890–C2 was inoculated aseptically. The medium for seed culture contained glucose 1%, starch 1%, meat extract 0.75%, peptone 0.75%, NaCl 0.3%, $MgSO_4 \cdot 7H_2O$ 0.1%, $CuSO_4 \cdot 5H_2O$ 0.0007%, $FeSO_4 \cdot 7H_2O$ 0.0001%, $MnCl_2 \cdot 7H_2O$ 0.0008%, and $ZnSO_4 \cdot 7H_2O$ 0.0002%. The shaking of 130 strokes per minute was given during the fermentation period (5 days) and temperature was kept at 27° C. This cultured broth was centrifuged to separate mycelia and 6000 ml. of the filtrate was obtained from the sixty flasks. The filtrate contained 35 μg./ml. of negamycin. The filtrate was passed through a column (diameter 30 mm.) containing 400 ml. of Amberlite IRC–50 (70% Na form). After washed with water, negamycin was eluted with 20% ammonia in water. The active fraction of 600 ml. was concentrated under reduced pressure, and 144 ml. of the concentrated solution (pH 9.4, 800 μg./ml.) was obtained.

The concentrated solution was passed through a column (diameter 16 mm.) containing 60 ml. of Dowex 1X2 (OH form). After washed with 200 ml. of water, negamycin was eluted with 0.5 N HCl. After neutralization with Amberlite IR–45 (OH form), the active fraction was dried under reduced pressure. The crude powder of negamycin hydrochloride of 300 mg. (purity 21%) was obtained.

EXAMPLE 2

A crude powder (300 mg.) of negamycin hydrochloride obtained in Example 1 was dissolved in 10 ml. of water. The solution was passed through a column (diameter 16 mm.) containing 60 ml. of Amberlite CG–50 ($NH_4$ form), followed by distilled water. The effluent was fractionated by 10 ml. The active effluent was found in fractions 57–96. From fractions 57–74, 25 mg. (purity 68 μg./mg.) of lightly yellowish powder of negamycin was obtained. From fractions 75–85, 20 mg. of colorless powder of pure negamycin was obtained. From fractions 86–96, 19 mg. (purity 910 μg./mg.) was obtained.

EXAMPLE 3

Various kinds of ion exchange resins were tested for isolation of negamycin. The broth filtrate of 200 ml. obtained by a procedure as shown in Example 1 was passed through a column (diameter 10 mm.) containing 10 ml. of a resin. The column was washed with 50 ml. of water, and then eluted as shown below. In all cases, no activity was recognized in effluents and water used for washing of the column. The results were as below:

| Ion exchange resin | Type | Elution | Recovery of negamycin, percent |
|---|---|---|---|
| Amberlite IRC-50 | H form | 2% $NH_4OH$ | 45 |
|  | 70% Na form | 2% $NH_4OH$ | 52 |
|  | 70% Na form | 1 N HCl | 29 |
|  | 70% $NH_4$ form | 2% $NH_4OH$ | 55 |
| Amberlite IR-120 | H form | 2% $NH_4OH$ | 45 |
| Lewatit SP-100 | do | 2% $NH_4OH$ | 50 |

EXAMPLE 4

The medium of 10 liters containing the same constituents as shown in Example 1 was placed in a glass fermenter of 20 liters. After sterilization, 500 ml. of the shaken-cultured broth of the strain No. M890–C3 was inoculated aseptically. The fermentation was operated at 27° C. for 90 hrs. under aeration and agitation. This cultured broth (pH 7.4) was centrifuged to separate mycelia and 6460 ml. (41 μg./ml.) of the filtrate was obtained. The filtrate was passed through a column (diameter 30 mm.) containing 400 ml. of Amberlite IRC–50 (70% Na form). After washed with 3000 ml. of water, negamycin was eluted with 2% ammonia. The active eluate of 400 ml. was dried under reduced pressure, and 685 mg. (purity 150 μg./ml.) of brownish powder of crude negamycin was obtained.

EXAMPLE 5

Negamycin of 102 mg. was dissolved in 8 ml. of water containing 15% ethylene glycol monomethyl ether. To this solution, 106 mg. of sodium p-hydroxy-azobenzene-p'-sulfonate was added. The mixture was warmed to 50° C. to dissolve, and then 0.5 ml. of 1 N HCl was added to adjust pH to 3. After storage in refrigerator, 49 mg. of yellow-orange crystals was obtained. It was recrystallized from the mixed solvent (water 4.5 ml. and methanol 0.5 ml.). Twenty eight mg. of yellow-orange crystals was obtained. M.P. 180–182° C. (dec.). The crystal has 34% activity of free negamycin against *E. coli* K12. Analysis: calcd. for $C_9H_{20}N_4O_4(C_{12}H_{10}N_2O_4S)_2 \cdot 2H_2O$: C, 47.13, H, 5.27, N, 13.33, O, 26.64, S, 7.63; found: C, 47.09; H, 5.16, N, 13.20, O, 25.53, S , 8.01.

EXAMPLE 6

A medium (130 liters) containing glucose 3%, starch 1%, soybean meal 2%, dried yeast 0.5%, $CaCO_3$ 0.35% $CuSO_4 \cdot 5H_2O$ 0.0005%, $MnCl_2 \cdot 7H_2O$ 0.0005%, and $ZnSO_4 \cdot 7H_2O$ 0.0005% was placed in a 200 liters stainless steel fermenter. After sterilization at 120° C. for 30 minutes, 1.2 liters of a cultured broth of the strain No. M890–C2 were inoculated aseptically. The stirring of 200 r.p.m. and the aeration of 25 liters air per minute were given during the fermentation period (113 hrs.) and temperature was kept at 27° C. The cultured broth of 110 liters (pH 7.4, 63 μg./ml.) was filtered with the aid of 8 kg. of diatomaceous earth after adjusting pH to 4.9 with 1 liter of 6 N HCl. Including the water used for washing of the filter, totally 117 liters of the filtrate were obtained. The filtrate was passed through a column containing 6.5 liters of Amberlite IRC–50 (70% NH$_4$ form). After washed with water, negamycin was eluted with 0.5 N ammonia. The active eluate of 3 liters was concentrated to 495 ml. (3520 μg./ml.) under reduced pressure. The concentrate was passed through a column containing Dowex 1X2 OH type). After washed with 350 ml. of water, negamycin was eluted with 0.5 N HCl. The active eluate of 180 ml. was neutralized with 3 N ammonia. Yellow-brownish powder (5.5 g.) of crude negamycin (purity 294 μg./mg.) was obtained after drying. The overall yield was 23.4%.

EXAMPLE 7

The powder of 3.4 g. having 29.4% purity obtained in Example 6 was dissolved in water of 22 ml. and adjusted to pH 8.8. This solution was applied to a column (diameter 26 mm.) filled with 250 ml. of Amberlite CG–50 (NH$_4$ form). After washed with 500 ml. of water, 0.1% NH$_4$OH was passed through the column. The eluate was fractionated by 20 ml. Negamycin was found in fractions 69–81. From fractions 69–73, 233 mg. (purity 90%) of pale-yellowish powder of negamycin was obtained. From fractions 74–77, 383 mg. of pure negamycin was obtained. From fraction 78–81, 395 mg. of pure negamycin was obtained.

Included within the scope of the present invention are negamycin and acid addition salts of negamycin with organic and inorganic acids such as hydrochloric acid, sulfuric acid, hydrobromic acid, phosphoric acid, nitric acid, citric acid, maleic acid, malic acid, tartaric acid, benzoic acid, cinnamic acid, ascorbic acid, acetic acid, picric acid, p-hydroxyazobenzene-p'-sulfonic acid, phytic acid, livopimaric-6,8a-cis-endosuccinic acid, sulfamic acid, glycolic acid and mandelic acid. For therapeutic purposes use is made of salts of nontoxic acids but salts of toxic acids, e.g., p-hydroxyazobenzene-p'-sulfonic acid, are useful in isolation procedures, e.g. as precipitants from aqueous solutions, and for disinfectant purposes where toxicity is not important.

When desired for specific purposes and rendered pharmaceutically compatible, there may be admixed with the compounds of present invention other medicaments such as antihistamines, sulfa drugs (e.g. sulfadiazine, sulfabenzamide, sulfacetamide, sulfanilamide, sulfapyridine, sulfathiazole, sulfapyrazine, sulfaguanidine, sulfathalidine, sulfasuxidine, sulfisoxazole, sulfamylon, phthalylsulfacetamide, N'-3,4-dimethylbenzoylsulfanilamide, benzylsulfanilamide and N'-2-(2-quinoxalyl) sulfanilamide), lipotropic agents (particularly methionine, choline, inositol and beta-sitosterol and mixtures thereof), stimulants of the central nervous system (e.g. aspirin, salicylamide, sodium gentisate, p-acetylaminophenol, phenacetin, codeine), laxatives (e.g. phenol-phthalein), sedatives (e.g. barbiturates, bromides), salts of penicillin (e.g. potassium penicillin G, procaine, penicillin G, 1-ephenamine pencillin G, dibenzylamine penicillin G; these combinations are particularly useful to enable variation of the pattern of blood levels obtained), phenoxymethyl-penicillin and salts thereof, other antibiotic agents (e.g. streptomycin, dihydrostreptomycin, kanamycin, bacitracin, polymixin, tyrothricin, erythromycin, chlortetracycline, oxytetracycline, tetracycline, oleandomycin, chloramphenicol, magnamycin, novobiocin, cycloserine, neomycin; in some cases such combinations attack a wider range of organisms or show synergistic efficacy or provide decreased toxicity with equal efficacy), vitamins (e.g. vitamins A, $A_1$, $B_1$, $B_2$, $B_6$, $B_{12}$ and members of that family, folic acid and members of that family, vitamins C, $D_2$, $D_3$ and E), hormones (e.g. cotrisone, hydrocortisone, 9-α-fluorocortisone, 9-α-fluorohydrocortisone, prednisone and prednisolone), anabolic agents (e.g. 11,17-dihydroxy - 9 - α - fluoro-17-α-methyl-4-androsten-3-one; 17 - α - ethyl - 19 - nortestosterone) and antifungal agents (e.g. myconstatin).

What we claim is:
1. The process for the production of an antibiotic, designated negamycin, which comprises cultivating a strain of *Streptomyces purpeofuscus* in an aqueous carbohydrate solution containing a nitrogenous nutrient under aerobic conditions until substantial antibacterial activity is imparted to said solution and then recovering said negamycin from said solution.

2. The process of claim 1 wherein the organism is *Streptomyces purpeofuscus*, A.T.C.C. 21470.

3. The process of claim 1 wherein the antibiotic negamycin is recovered from an aqueous solution thereof by adsorption on a cation exchange resin and subsequent elution.

4. The process of claim 1 wherein the antibiotic negamycin is recovered from an aqueous solution thereof by adsorption on carbon and subsequent elution.

5. The process of claim 1 wherein the antibiotic negamycin is recovered from an aqueous solution thereof by adsorption on strongly basic anion exchange resin and subsequent elution.

6. The process of claim 1 wherein the antibiotic negamycin is recovered from an aqueous solution by precipitation with a water-insoluble acid and the subsequent separation from the acid.

7. A process according to claim 2 wherein ammonia is used for elution of the adsorbed antibiotic.

References Cited

Hamada et al.: Journal of Antibiotics, vol. 23, No. 3, p. 170 (1970).

A. LOUIS MONACELL, Primary Examiner

R. J. WARDEN, Assistant Examiner

U.S. Cl. X.R.

260—534 M; 424—188, 319